(12) United States Patent
Ciotola

(10) Patent No.: US 6,325,722 B1
(45) Date of Patent: Dec. 4, 2001

(54) SHAFT COUPLING ALIGNMENT DEVICE

(76) Inventor: Alfredo A. Ciotola, 6 Trinity Pl., Warren, NJ (US) 07059

(*) Notice: Subject to any disclaimer, the term of this patent is extended or adjusted under 35 U.S.C. 154(b) by 0 days.

(21) Appl. No.: 09/300,772

(22) Filed: Apr. 27, 1999

(51) Int. Cl.[7] ................................................. F16D 3/52
(52) U.S. Cl. ........................... 464/85; 464/93; 464/137
(58) Field of Search ................................ 464/81, 85, 87, 464/93, 92, 137

(56) References Cited

U.S. PATENT DOCUMENTS

| | | |
|---|---|---|
| 268,807 | 12/1882 | Landis . |
| 1,188,113 | 6/1916 | Thomas . |
| 1,343,413 * | 6/1920 | Smith et al. ............................ 464/81 |
| 1,365,957 | 1/1921 | Smith . |
| 1,402,688 * | 1/1922 | Travis .................................... 464/95 |
| 1,482,097 | 1/1924 | Smith . |
| 1,814,836 | 6/1931 | Lederman . |
| 1,862,355 | 6/1932 | Anderson . |
| 2,181,888 | 12/1939 | Gustin . |
| 2,453,012 * | 11/1948 | Hickman ............................... 464/87 |
| 2,930,211 * | 3/1960 | Guy ........................................ 464/93 |
| 3,304,743 | 2/1967 | Paulsen . |
| 3,422,637 * | 1/1969 | Kelley .................................... 464/93 |
| 3,724,239 * | 4/1973 | Calistrat ................................ 464/92 |
| 4,591,350 | 5/1986 | Obermeier . |
| 5,676,613 * | 10/1997 | Valcourt et al. ..................... 474/102 |

* cited by examiner

Primary Examiner—Lynne H. Browne
Assistant Examiner—Aaron Dunwoody

(57) ABSTRACT

The invention relates to a coupling for attaching a pair of longitudinally aligned, rotatable shafts. In one embodiment, the coupling has a pair of circular hubs having a bore through a central axis thereof. Suitable means fix a shaft within each bore. Several circular apertures are spaced around and through each hub and a hollow bushing is positioned in each circular aperture. A circular power ring is positioned between the hubs, the ring has several rounded coupling pins extending outwardly from its front and rear surfaces. Each pin is mounted within a corresponding one of the hollow bushings. In another embodiment, the coupling has the pins extend inwardly from each hub and the corresponding apertures are through the power ring. The hub pins are mounted within a corresponding one of the hollow bushings through the power rings. The invention also relates to an assembly comprising a coupling as described above, and a shaft fixed within the bore of each hub of the coupling.

23 Claims, 4 Drawing Sheets

SHAFT COUPLING ALIGNMENT DEVICE

BACKGROUND OF THE INVENTION

1. Field of the Invention

The present invention relates to shaft couplings. More particularly, the invention relates to a free-floating coupling for joining rotatable shafts which tolerates shaft misalignment.

2. Description of the Prior Art

Rotatable shafts are typically used in motor powered mechanical devices such as pumps and the like. These devices cooperate with a motor via a rotatable shaft which, when rotated along a fixed axis, rotates other machine parts. Because these shafts can only reach limited lengths, they are often connected to one another to form a longer, continuous rotatable shaft. Attempts have been made in the art to compensate for misalignment in rotatable shafts, however rotational vibrations in such shafts and couplings eventually result in an angular distortion and misalignment between the shafts. Shaft axes inevitably exert a lateral force which causes bearing to wear out. This leads to improper shaft rotation.

Various attempts have been made to compensate for misalignment between rotatable shafts. U.S. Pat. No. 268,807 discloses a coupling for shafts which includes a pair of end units with openings for the shafts and which are held onto the shafts via set screws. The end units have links that connect to a central unit via spherical ends on the links and transmits motion thereby. The pins may be spherical but they do not directly connect the end units with the central disk, rather they are connected via intermediate linkages. U.S. Pat. No. 4,591,350 discloses a compensator coupling which includes an intermediate sleeve with resilient bushings for engaging shaft ends. A shaft presses against a spherical ring, and compression springs are required. U.S. Pat. No. 1,862,355 discloses a flexible coupling which includes a bar that carries spherical engagement pins. A bar is bent at right angles to form ends which carry spherical arrangement pins. U.S. Pat. No. 1,188,113 shows a three disk arrangement where the disks are attached by bolts surrounded by springs. U.S. Pat. No. 2,181,888 shows a three disk arrangement where the disks are indirectly connected via links. U.S. Pat. No. 1,482,097 shows a flexible coupling whose end members are linked by a support disk via straight pins. U.S. Pat. No. 3,304,743 shows a coupling having hubs which are connected via an intermediate plate. Ball connectors are intended to pivot and slide in the bore, and a shaft is required. U.S. Pat. No. 1,365,957 shows a spring coupling. U.S. Pat. No. 1,814,836 shows a shaft coupling with tapered coupling pins. Each of the foregoing designs are ineffective for tolerating shaft misalignment.

It would be desirable to provide a free-floating coupling device for joining rotatable shafts which tolerates vibration induced shaft misalignment. The coupling device of the present invention solves this problem. Such a coupling allows for flexibility at the joining point while tolerating misalignment in the rotatable shafts.

SUMMARY OF THE INVENTION

The invention provides a coupling for attaching a pair of longitudinally aligned, rotatable shafts comprising:

a) a pair of circular hubs having an inner flat surface and an outer surface, each hub having a bore through a central axis thereof; means for fixing a shaft within each bore; a plurality of circular apertures through and spaced around each hub; a hollow bushing positioned in each circular aperture;

b) a circular power ring positioned between the hubs; said ring having front and rear flat surfaces; a plurality of rounded coupling pins extending outwardly from each of the front and rear surfaces; each of said coupling pins being mounted within a corresponding one of the hollow bushings.

The invention also provides a coupling for attaching a pair of longitudinally aligned, rotatable shafts comprising:

a) a pair of circular hubs having an inner flat surface and an outer surface, each hub having a bore through a central axis thereof; means for fixing a shaft within each bore; a plurality of rounded coupling pins extending outwardly from the inner surface;

b) a circular power ring positioned between the hubs; said ring having front and rear flat surfaces; a plurality of circular apertures extending through and spaced around the power ring; a hollow bushing positioned in each circular aperture; each of said coupling pins being mounted within a corresponding one of the hollow bushings.

The invention further provides a process for attaching a pair of longitudinally aligned, rotatable shafts comprising:

i) providing a coupling comprising:

a) a pair of circular hubs having an inner flat surface and an outer surface, each hub having a bore through a central axis thereof; means for fixing a shaft within each bore; a plurality of circular apertures through and spaced around each hub; a hollow bushing positioned in each circular aperture;

b) a circular power ring positioned between the hubs; said ring having front and rear flat surfaces; a plurality of rounded coupling pins extending outwardly from each of the front and rear surfaces;

ii) attaching a two shafts to said coupling, one shaft being attached to each circular hub through each bore;

iii) mounting each of said coupling pins within a corresponding one of the hollow bushings.

The invention still further provides a process for attaching a pair of longitudinally aligned, rotatable shafts comprising:

i) providing a coupling comprising:

a) a pair of circular hubs having an inner flat surface and an outer surface, each hub having a bore through a central axis thereof; means for fixing a shaft within each bore; a plurality of rounded coupling pins extending outwardly from the inner surface;

b) a circular power ring positioned between the hubs; said ring having front and rear flat surfaces; a plurality of circular apertures extending through and spaced around the power ring; a hollow bushing positioned in each circular aperture;

ii) attaching a two shafts to said coupling, one shaft being attached to each circular hub through each bore;

iii) mounting each of said coupling pins within a corresponding one of the hollow bushings.

DETAILED DESCRIPTION OF THE PREFERRED EMBODIMENT

Figure 1:
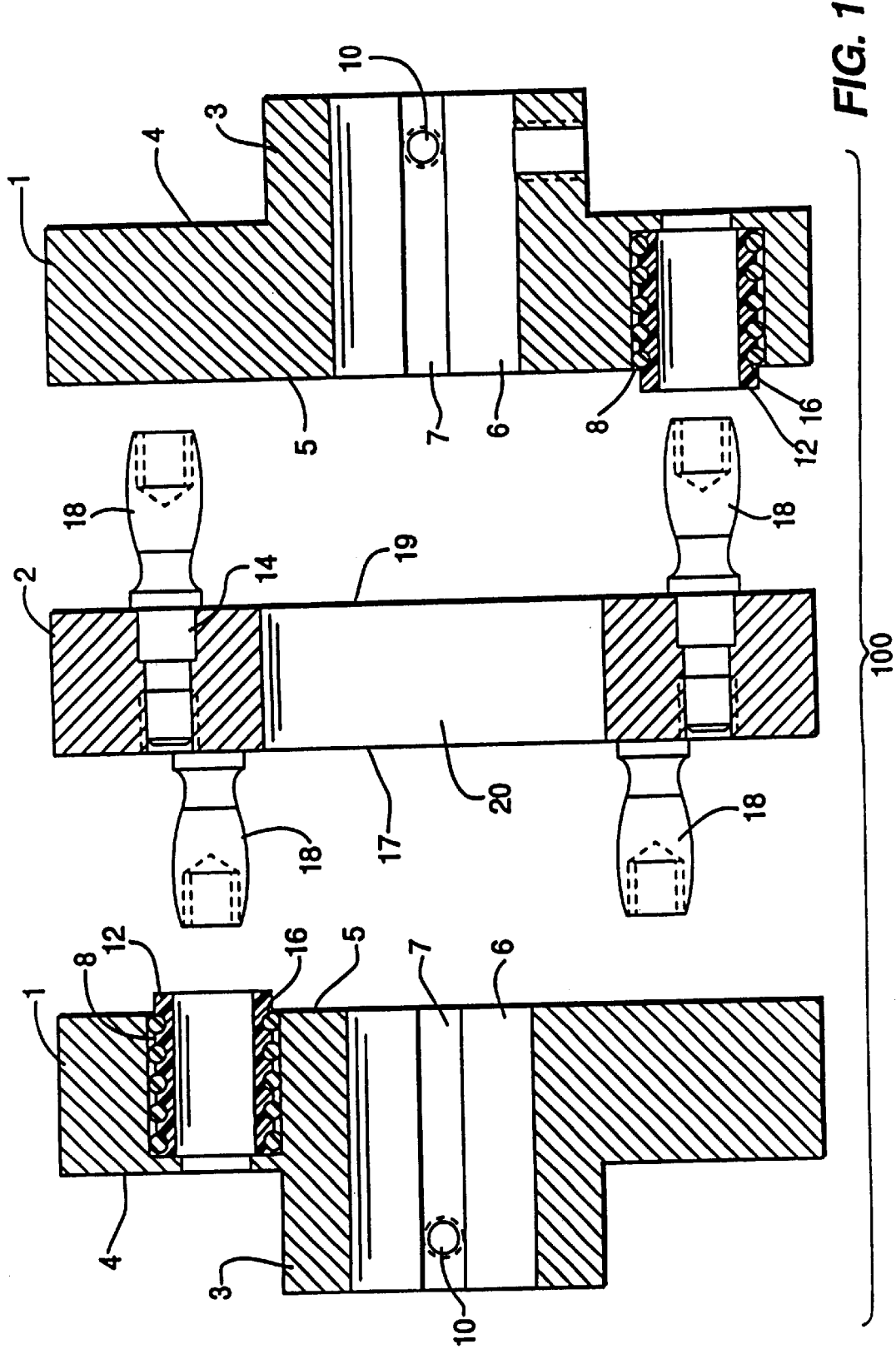
FIG. 1 shows a sectional side-view of a coupling according to the invention.

The invention provides a free-floating coupling for joining and self-aligning rotatable shafts. Referring to FIG. 1, a coupling 100 is shown which has first and second circular hubs 1, and a circular power ring 2 positioned between the circular hubs. Each circular hub 1 has an inner flat surface 5 and an outer surface 4. Each hub also has a bore 6 through the hub's central axis. The bore extends entirely through the hub 1. The bore 6 has a means 7 for fixing a circular shaft (not shown) within each hub bore 6. Each shaft terminates substantially flush with the inner flat surface 5 of each hub. The means 7 may comprise a keyway or the like through each hub for engaging a complementary key on the shaft. Each shaft is fixed within each keyway, for example, by means of a screw 10. The outer surface 4 of each hub may contain a shaft supporting sleeve 3 which is concentric with bore 6, and which projects out from the outer surface 4 of each hub.

Figure 2:
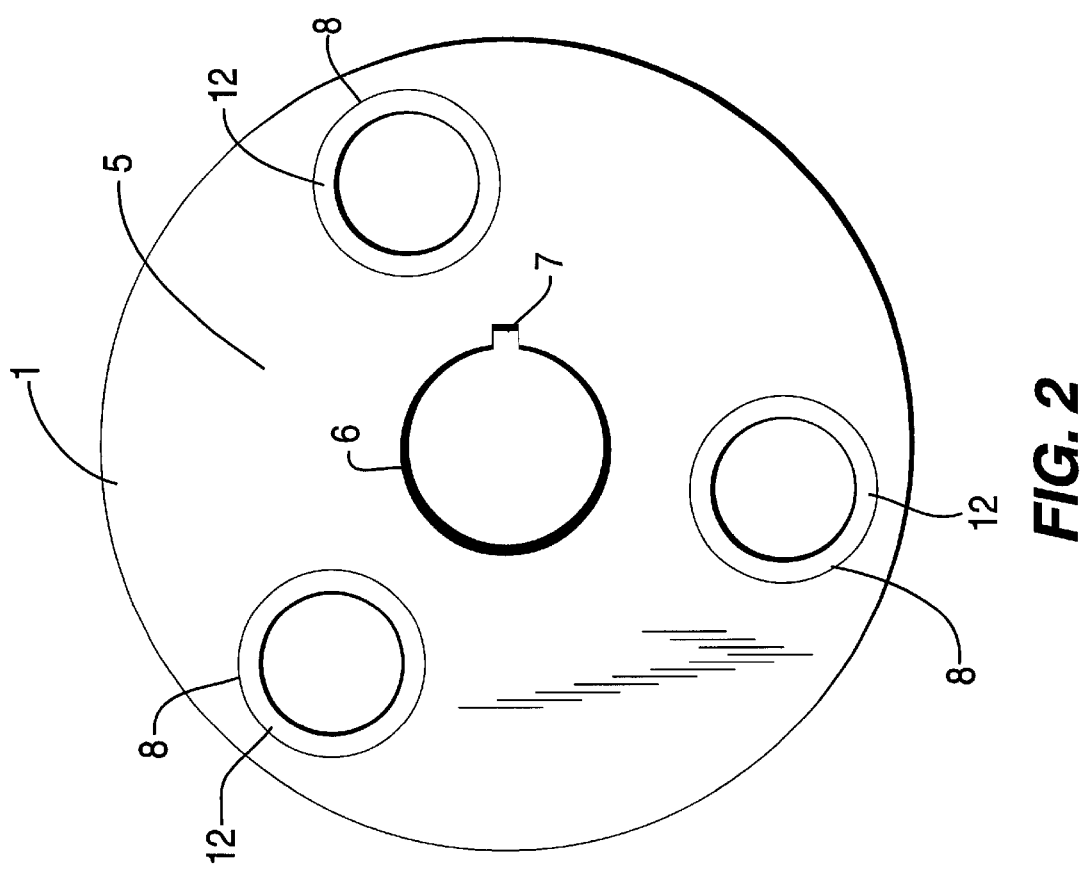
FIG. 2 shows a bottom view of a circular hub of the invention.

As shown in FIG. 2, each hub 1 has a plurality of circular apertures 8 through the hub 1 which are spaced around the bore 6. Although each hub is shown with three apertures, it may contain from about two to about twelve or more circular apertures 8. The apertures are preferably equally spaced around each hub and have centers equidistant from a central axis of the bore 6 as shown. However, there may also be two or more arrays rows of apertures having centers at equal radii per row from the center of the bore.

Each circular aperture 8 has an annular hollow bushing 12, shown in FIG. 1, which may protrude slightly from the inner flat surface 5 of each hub by from about ⅟₃₂ inch to about ³⁄₃₂ inch to thereby buffer any contact between the hubs 1 and the power ring 2. The bushings 12 preferably have a grooved outer surface which contain a plurality of spaced o-rings 16 in the grooves of each bushing. The o-rings are set between each bushing and an inner aperture wall and provide a cushioning effect to the torque drive from the shafts. The o-rings are preferably coated with a suitable lubricant such as lithium grease.

Figure 5:
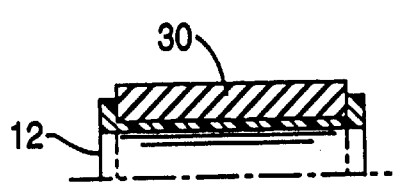
FIG. 5 shows a schematic representation of a flat rubber sleeve for use with a bushing of the present invention
Figure 6:
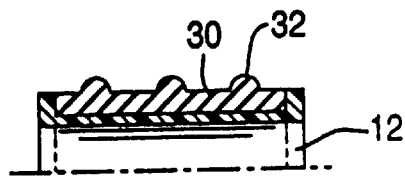
FIG. 6 shows a schematic representation of a rubber sleeve having ridges for use with a bushing of the present invention.

Alternatively, as shown in FIGS. 5 and 6, a cylindrical rubber sleeve 30 may be provided between each bushing 12 and each circular aperture wall. The rubber sleeve 30 may be flat as shown in FIG. 5 or may contain ridges 32, as shown in FIG. 6, to thereby substitute for the o-rings. The bushings 12 are preferably composed of an elastomeric material such as rubber or a polyamide. The bushing material should have a low coefficient of friction and be capable of resisting dimensional deformation at temperatures of up to about 570° F. A preferred bushing material is Torlon 4301, which is commercially available from BP Amoco p.l.c. of London, UK. The o-rings or rubber sleeve is preferably composed of a fluoroelastomer material such as DuPont Viton or a #70 durometer rubber.

Figure 3:
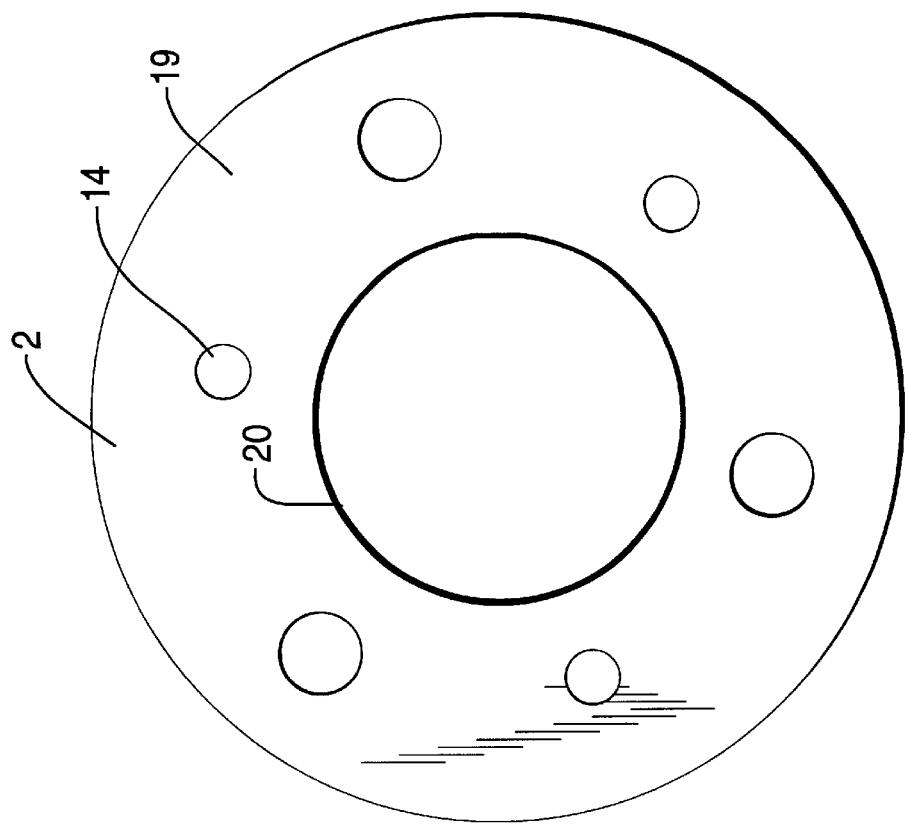
FIG. 3 shows a bottom view of a circular power ring of the invention.
Figure 4:
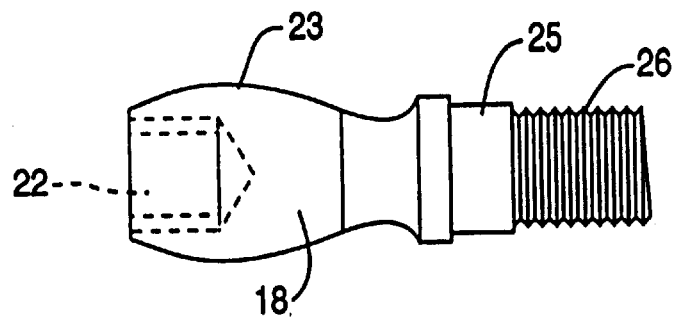
FIG. 4 shows a side-view of a coupling pin of the present invention.

The circular power ring 2 has a front flat surface 17, a rear flat surface 19, and a central bore 20 through the power ring's central axis. The circular power ring 2 may have a diameter less than the diameter of each circular hub 1. As seen in FIG. 3, the power ring 2 also contains a plurality of circular apertures 14, preferably from about two to about twelve, having inner threads which engage with complementary threads on coupling pins 18. Referring to FIG. 4, the coupling pins 18 each have a round head 23, preferably barrel shaped, and a screw end 25. Each round head 23 has a recessed fitting 22 for engaging an Allen wrench. The screw ends 25 of the pins 18 have outer threads 26 which engage with the inner threads of the apertures 14 in the power ring 2.

There are preferably from about two to about twelve coupling pins extending outwardly from each of the front flat surface 17 and the rear flat surface 19 of the power ring 2. It is preferred that each of the front flat surface 17 and the rear flat surface 19 of the power ring have the same number of pins. The pins 18 on both the front flat surface 17 and the rear flat surface 19 are preferably arranged symmetrically balanced around the central bore 20. The round heads 23 of the coupling pins are shaped to engage with the hollow bushings 12 inside the circular apertures 8 of the circular hubs 1. Most preferably, each hub 1 contains about three apertures 8, and the power ring 2 has about three coupling pins 18 extending outwardly from each of the front flat surface 17 and rear flat surface 19.

In a preferred embodiment of the invention, shown in FIG. 1, a free-floating coupling device is assembled by engaging coupling pins 18 on a front flat surface 17 of a circular power ring 2 with hollow bushings 12 located inside circular apertures 8 of a first circular hub 1. Likewise, coupling pins 18 on a rear flat surface 19 of the circular power ring are engaged with hollow bushings 12 located inside circular apertures 8 of a second circular hub 1.

Figure 10:
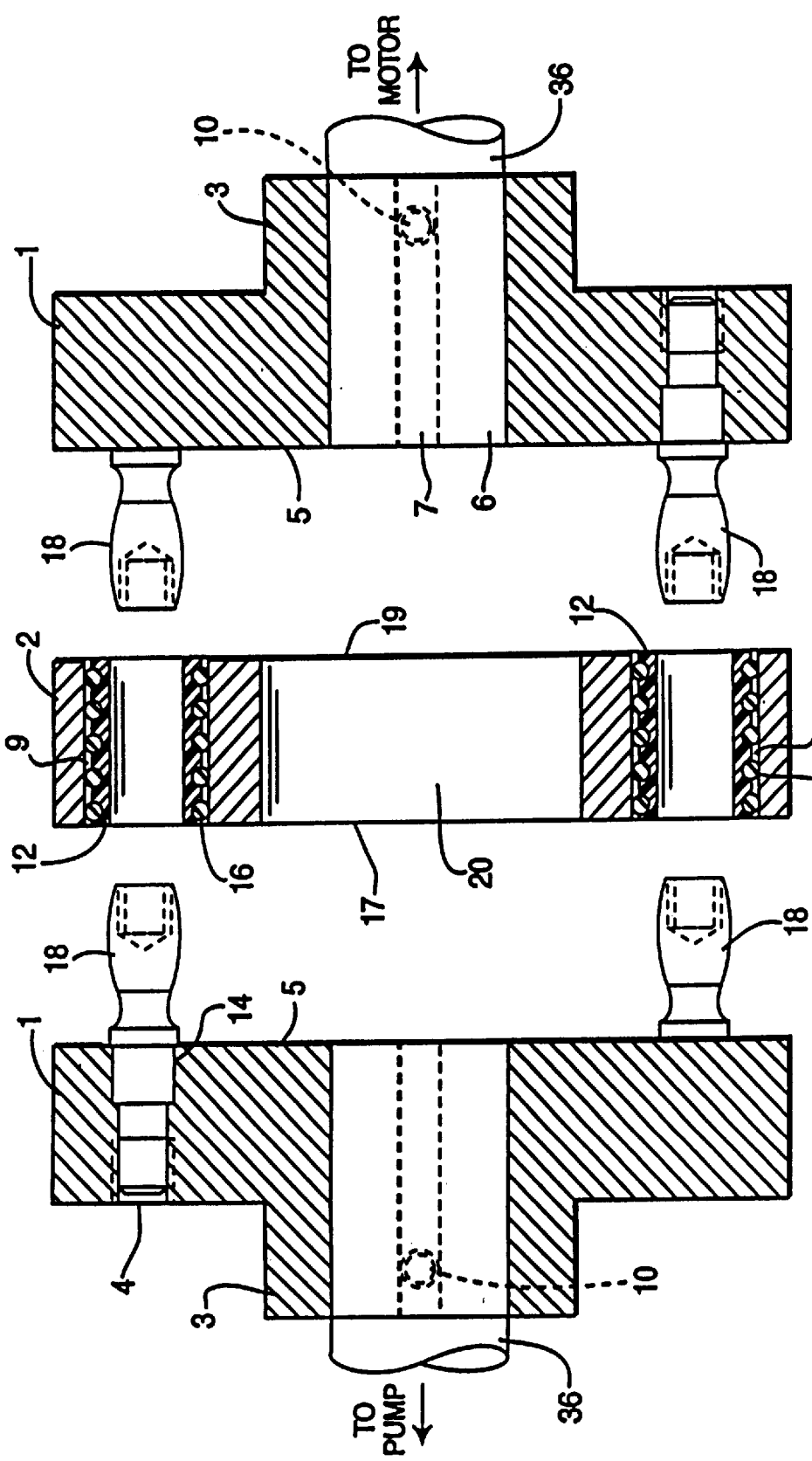
FIG. 10 shows a side view of an alternative coupling of the invention.

In an alternative embodiment of the invention, the pins 18 are positioned to extend inwardly from the hubs 1 and engage bushings 12 in apertures through the power ring 2. As shown in FIG. 10, a free-floating coupling device is assembled by engaging coupling pins 18 on an inner flat surface 5 of a first circular hub 1 with hollow bushings 12 located inside circular apertures 9 on a front flat surface 17 of a circular power ring 2. Likewise, coupling pins 18 on an inner flat surface 5 of a second circular hub 1 are engaged with hollow bushings 12 located inside circular apertures 9 on a rear flat surface 19 of the circular power ring. As shown, a shaft 36 is positioned within the bore of each hub 1. As an example, one of the shafts may connect to a motor, such as a 7 h.p. to 1,000 h.p. motor or larger, and the other shaft may connect to a pump, such as a pump in a chemical process or water transmitting facility, or other suitable mechanical device.

Figure 7:
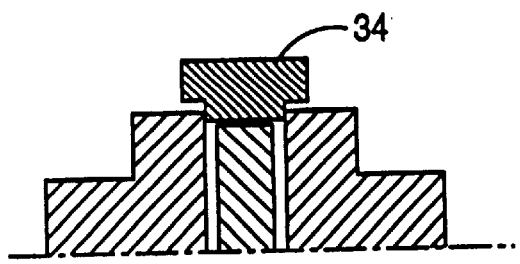
FIG. 7 shows a schematic representation of a spacer for aligning the hubs and power ring.

In order to achieve proper shaft rotation, it is important that the hubs have appropriate clearance from the power ring such that the power ring is free to move between the two hubs. Such may be accomplished by use of a spacing template 34 as shown in FIG. 7. The spacing template is used to properly align the power ring 2 and the hubs 1 during assembly of the coupling of the invention. Such may comprises a notched block composed of any suitable material.

Figure 8:
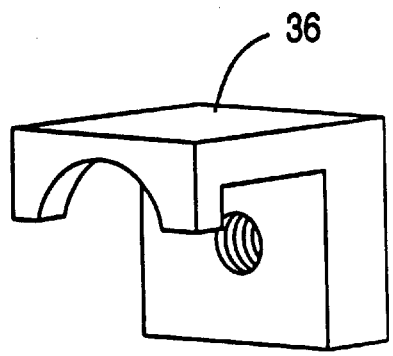
FIG. 8 shows a perspective view of a bushing extractor useful for extracting a bushing from the hub.
Figure 9:
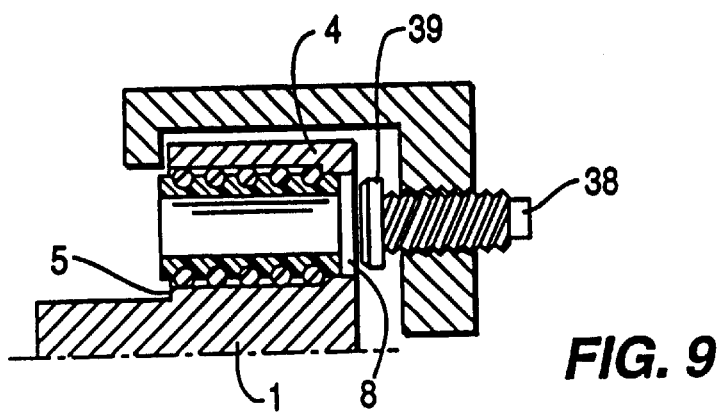
FIG. 9 shows a side sectional view of bushing extractor useful for extracting a bushing from the hub.

In the practice of the invention, it is foreseen that the bushings 18, o-rings 16 and/or rubber sleeves 30, 32 may periodically wear out and must be replaced. Worn out bushings may be removed by employing a bushing extractor 36, shown in FIG. 8. Referring to FIG. 9, the bushing extractor 36 is engaged with a hub 1 so that a screw 38 through the bushing extractor 36 is aligned with a circular aperture 8 on the outer surface 4 of the hub 1. The screw 38 is then rotated so that a flat screw surface 39 pushes the bushing 12 through the circular aperture 8 from the hub's outer surface 4 and out through the same circular aperture on the hub's inner flat surface 5.

The circular hubs, the circular power ring, and the coupling pins may be made of any suitable material, the most preferred being stainless steel. The hubs and power ring may have any suitable diameter, for example from about 2 inches or less to about two feet in diameter or more.

In the practice of the invention, a shaft 36 is connected to a motor or a pump, or the like. As the shafts rotate, they cause rotation of the coupling of the present invention. During rotation, longitudinal alignment of the shafts may become distorted or misaligned. However, because the circular power ring is free floating with respect to each hub, the coupling of the invention allows for a great degree of tolerable flexibility between the hubs and the power ring. If the shafts become misaligned, the bushings transmit rotational force along the sides of the pins. The power ring then corrects for misalignment.

The power ring and hubs re-align distortion between the two shafts. Since the coupling does not transmit any significant radial force to the rotating shafts it will increase the life of the coupling. Another advantage of the coupling of the invention is that the same size pins and bushings can be used with any size hubs or power rings. It is also within the contemplation of the instant invention that a several coupling devices according to the invention may be connected in series.

While the invention has been shown and described with reference to a preferred embodiment, it is not to be considered limited thereby, but only construed in accordance with the following claims.

What is claimed is:

1. A coupling for attaching a pair of longitudinally aligned, rotatable shafts comprising:
   a) a pair of circular hubs having an inner flat surface and an outer surface, each hub having a bore through a central axis thereof; means for fixing a shaft within each bore; a plurality of circular apertures through and spaced around each hub; a hollow bushing positioned in each circular aperture;
   b) a circular power ring positioned between the hubs; said ring having front and rear flat surfaces; a plurality of rounded coupling pins extending outwardly from each of the front and rear surfaces; each of said coupling pins being mounted within a corresponding one of the hollow bushings, and wherein the circular power ring is free floating with respect to each hub.

2. The coupling of claim 1 wherein each hub further comprises a shaft supporting sleeve which is concentric with said bore, projecting out from each outer surface of each hub.

3. The coupling of claim 1 wherein the means for fixing a shaft within each bore comprises a keyway through the hub and facing said bore, for engaging a key on each shaft and a screw which is turnable into said keyway.

4. The coupling of claim 2 wherein the means for fixing a shaft within each bore comprises a keyway through the hub and the sleeve and facing said bore, for engaging a key on each shaft and a screw which is turnable into said keyway.

5. The coupling of claim 1 wherein the circular apertures are equally spaced around each hub and have centers equidistant from the central axis of the bore.

6. The coupling of claim 5 wherein each hub has from about two to about twelve apertures and the power ring has from about two to about twelve coupling pins extending outwardly from each of the front and rear surfaces.

7. The coupling of claim 5 wherein each hub has three apertures and the power ring has three coupling pins extending outwardly from each of the front and rear surfaces.

8. The coupling of claim 1 wherein the circular apertures are arranged in a plurality of arrays such that each array has a plurality of apertures; the apertures within each array being equally spaced around each hub and having centers equidistant from the central axis of the bore.

9. The coupling of claim 1 wherein the power ring has a bore through a central axis thereof.

10. The coupling of claim 1 wherein each bushing has a plurality of o-rings on a surface adjacent to each aperture.

11. The coupling of claim 1 wherein each coupling pin is barrel shaped.

12. The coupling of claim 1 wherein each coupling pin has a screw end for attaching into the power ring.

13. The coupling of claim 12 wherein each coupling pin has a recessed fitting at an end opposite to the screw end for engaging a wrench.

14. The coupling of claim 1 wherein the hubs, power ring, and pins comprise stainless steel.

15. The coupling of claim 1 wherein the bushings comprises an elastomeric material.

16. The coupling of claim 1 wherein the diameter of the circular power ring is less than the diameter of each circular hub.

17. The coupling of claim 1 wherein the circular power ring is spaced from each hub by from about 1/32 inch to about 3/32 inch.

18. An assembly comprising the coupling of claim 1 and a shaft fixed within the bore of each hub.

19. The assembly of claim 18 further comprising a motor attached to one of the shafts.

20. The assembly of claim 18 further comprising a motor attached to one of the shafts and a pump attached to another shaft.

21. A coupling for attaching a pair of longitudinally aligned, rotatable shafts comprising:
   a) pair of circular hubs having an inner flat surface and an outer surface, each hub having a bore through a central axis thereof; means for fixing a shaft within each bore; a plurality of rounded coupling pins extending outwardly from the inner surface;
   b) a circular power ring positioned between the hubs; said ring having front and rear flat surfaces; a plurality of circular apertures extending through and spaced around the power ring; a hollow bushing positioned in each circular aperture; each of said coupling pins being, mounted within a corresponding one of the hollow bushings and wherein the circular power ring is free floating with respect to each hub.

22. A process for attaching a pair of longitudinally aligned, rotatable shafts comprising:
   i) providing a coupling comprising:
      a) a pair of circular hubs having an inner flat surface and an outer surface, each hub having a bore through a central axis thereof; means for fixing a shaft within each bore; a plurality of circular apertures through and spaced around each hub; a hollow bushing positioned in each circular aperture;

b) a circular power ring positioned between the hubs; said ring having front and rear flat surfaces; a plurality of rounded coupling pins extending outwardly from each of the front and rear surfaces, and wherein the circular power ring is free floating with respect to each hub;

ii) attaching a two shafts to said coupling, one shaft being attached to each circular hub through each bore;

iii) mounting each of said coupling pins within a corresponding one of the hollow bushings.

23. A process for attaching a pair of longitudinally aligned, rotatable shafts comprising:

i) providing a coupling comprising:

a) a pair of circular hubs having an inner flat surface and an outer surface, each hub having a bore through a central axis thereof; means for fixing a shaft within each bore; a plurality of rounded coupling pins extending outwardly from the inner surface;

b) a circular power ring positioned between the hubs; said ring having front and rear flat surfaces; a plurality of circular apertures extending through and spaced around the power ring; a hollow bushing positioned in each circular aperture and wherein the circular power ring is free floating with respect to each hub;

ii) attaching a two shafts to said coupling, one shaft being attached to each circular hub through each bore;

iii) mounting each of said coupling pins within a corresponding one of the hollow bushings.

* * * * *